United States Patent
Futter et al.

Patent Number: 5,858,543
Date of Patent: *Jan. 12, 1999

[54] SILANE COATED FLAVOR/AROMA BARRIER FILM

[75] Inventors: Daniel Edward Futter, Uccle, Belgium; Ming-Hsiung Yeh, New Freedom, Pa.

[73] Assignee: Dow Corning Corporation, Midland, Mich.

[*] Notice: The term of this patent shall not extend beyond the expiration date of Pat. No. 5,370,937.

[21] Appl. No.: 559,011

[22] Filed: Nov. 15, 1995

Related U.S. Application Data

[63] Continuation-in-part of Ser. No. 330,634, Oct. 28, 1994, abandoned, which is a continuation of Ser. No. 124,090, Sep. 20, 1993, Pat. No. 5,434,007.

[51] Int. Cl.$^6$ ...................................................... B32B 27/28
[52] U.S. Cl. .......................... 428/447; 428/448; 428/449; 428/451; 428/412; 428/480; 428/474.7; 428/523
[58] Field of Search ...................................... 428/447, 448, 428/449, 451, 26, 38, 412, 480, 474.7, 515, 523; 426/279; 522/95, 94

[56] References Cited

U.S. PATENT DOCUMENTS

| | | | |
|---|---|---|---|
| 5,096,738 | 3/1992 | Wyman | 427/44 |
| 5,260,350 | 11/1993 | Wright | 522/42 |
| 5,370,937 | 12/1994 | Lee et al. | 428/448 |

*Primary Examiner*—Paul Thibodeau
*Assistant Examiner*—D. Lawrence Tarazano
*Attorney, Agent, or Firm*—Richard I. Gearhart

[57] ABSTRACT

The present invention relates to the composition and preparation of composite films which exhibit low oxygen and flavor/aroma transmission rates. The film comprises a silane resin coated on a plastic substrate. The silane resin is formed from the mixture of a silane solution, an acrylate, a solvent, and optionally, either an additive, water or both. This invention teaches that a variety of silane solutions and acrylates may be mixed with different solvents to achieve the desired oxygen and flavor/aroma barrier characteristics.

7 Claims, 5 Drawing Sheets

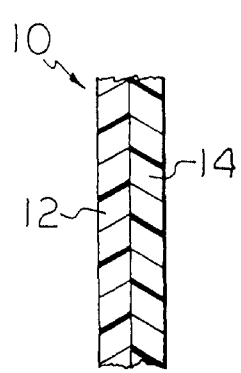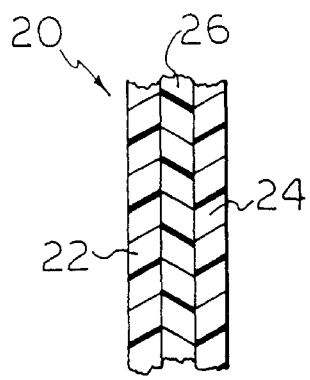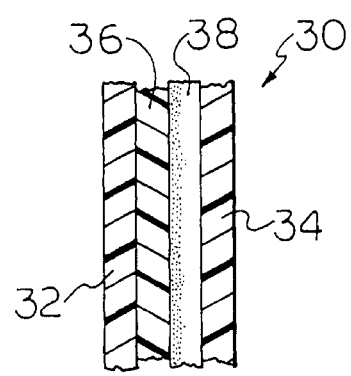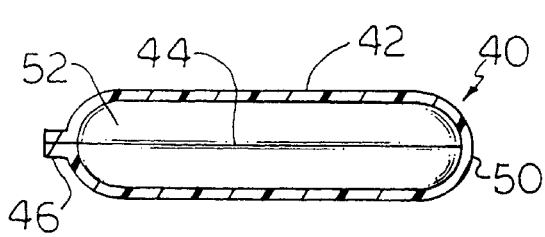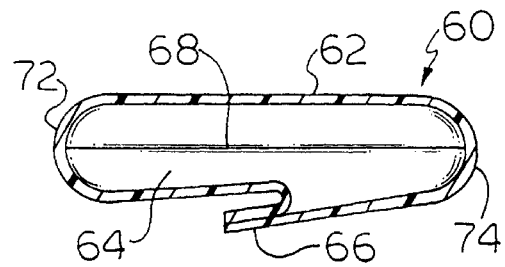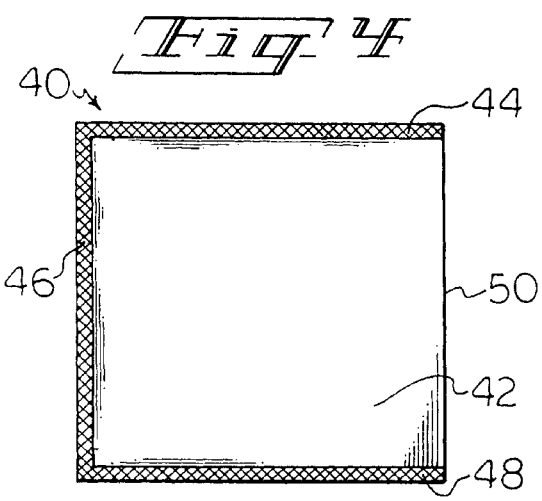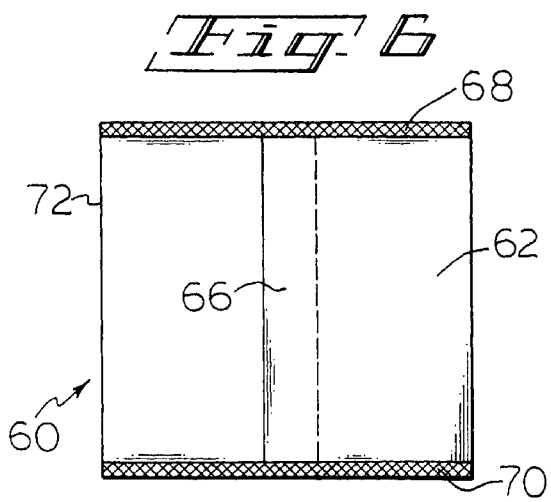

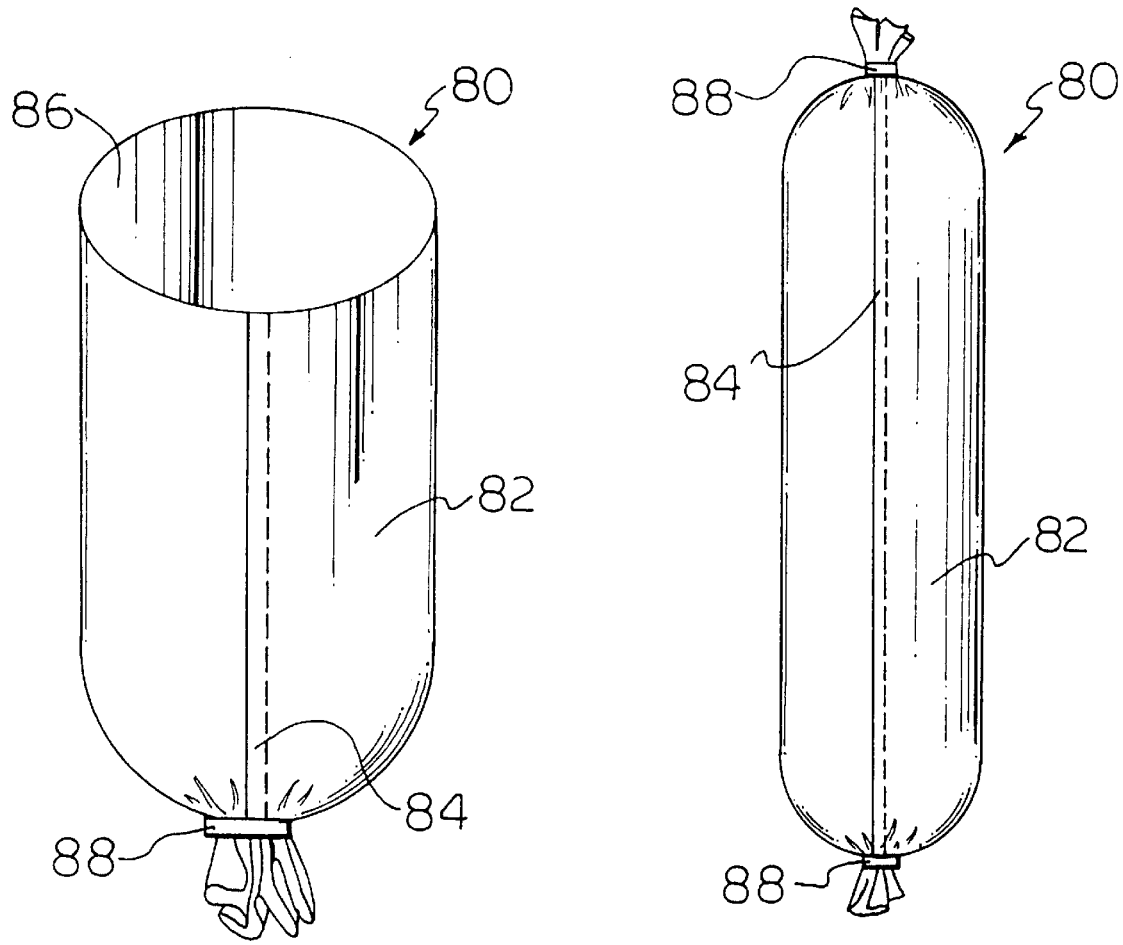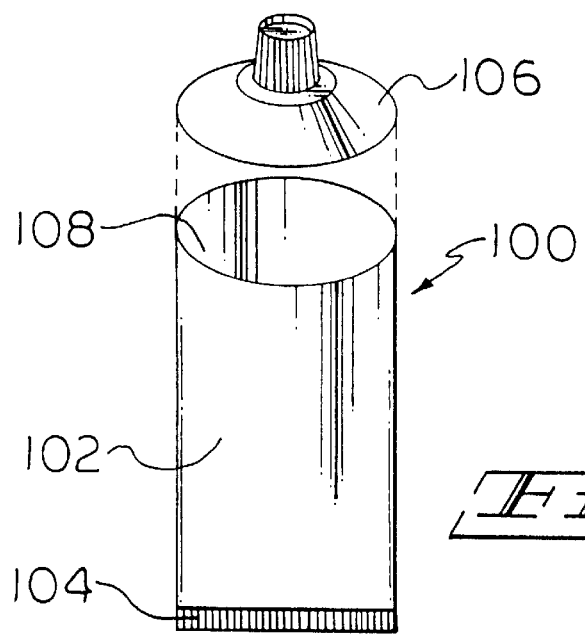

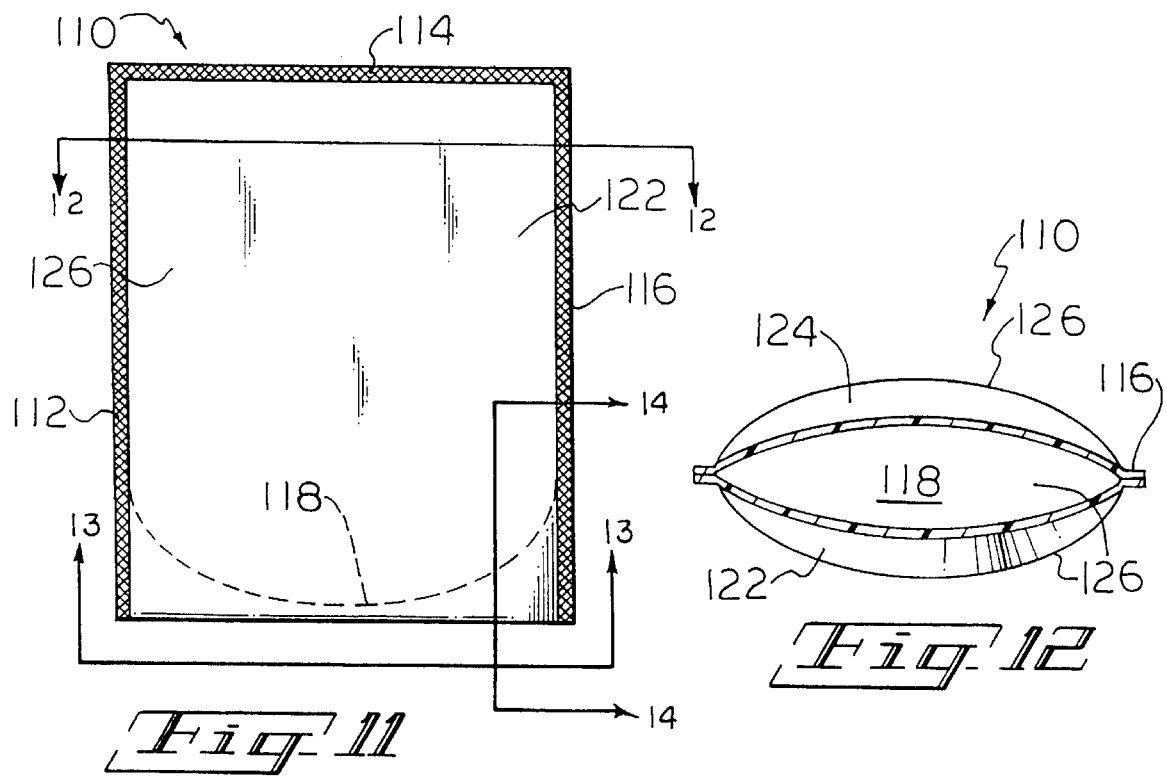
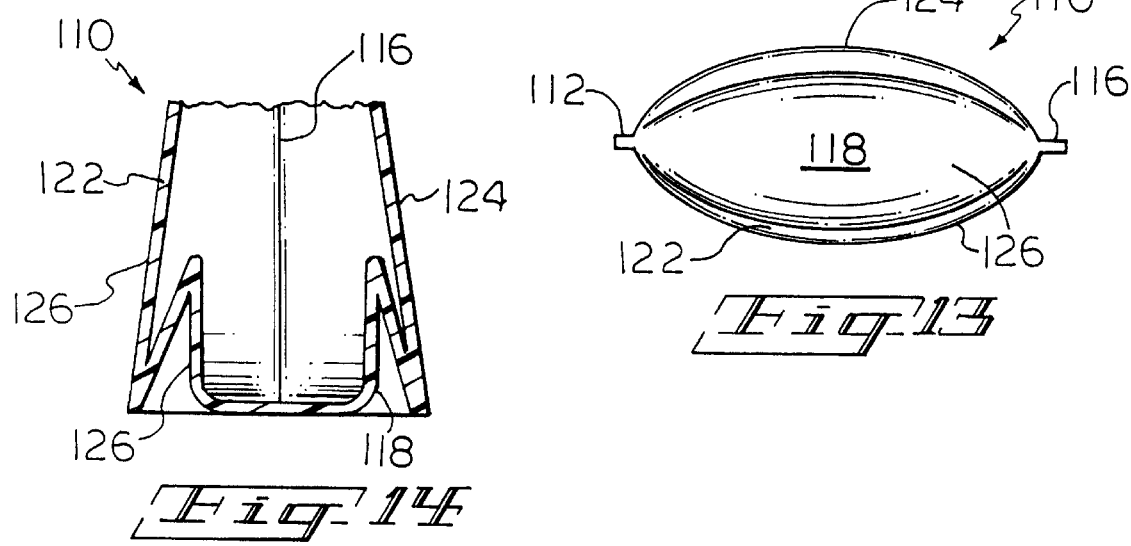

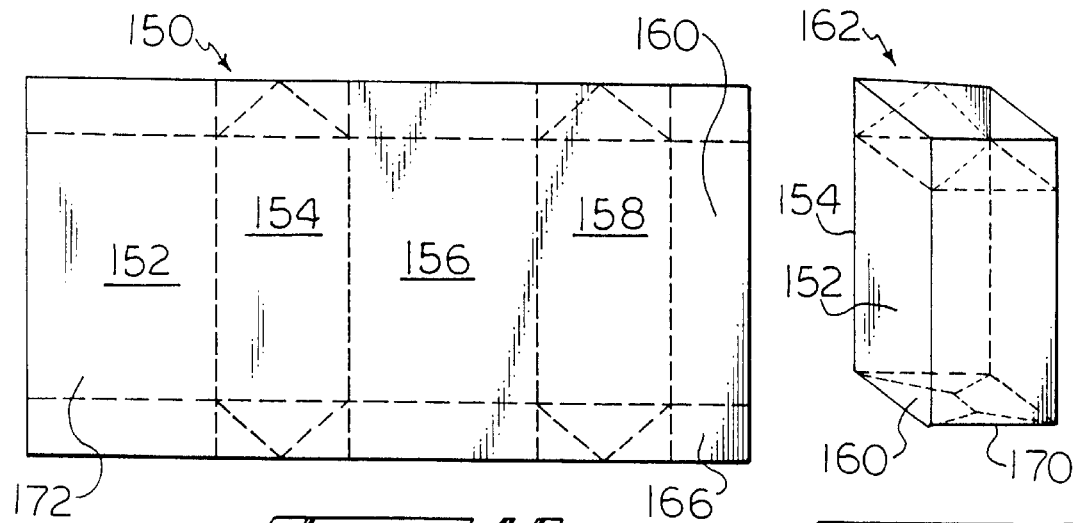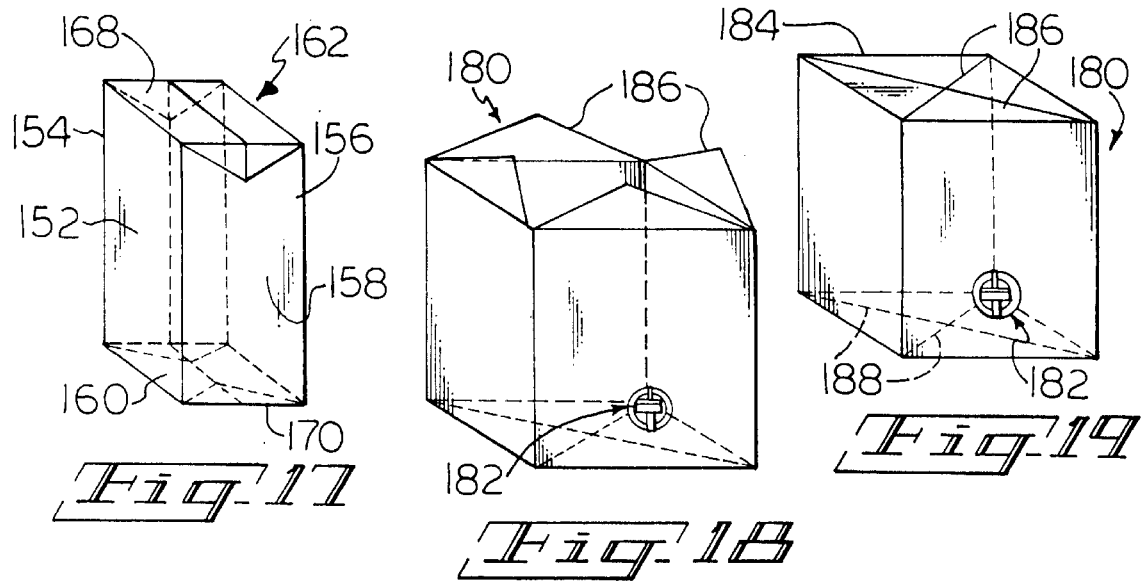

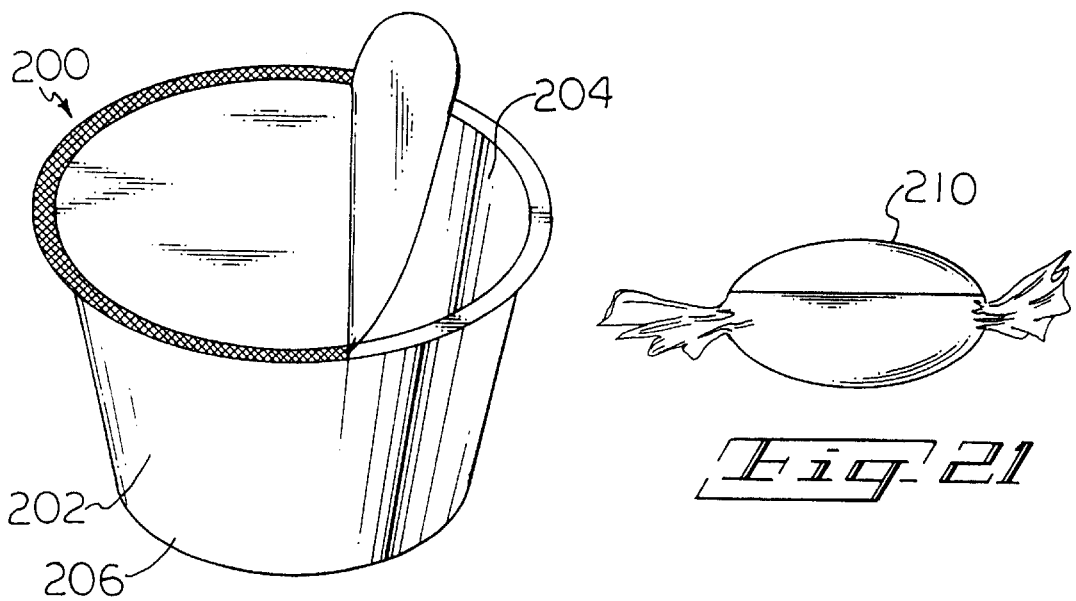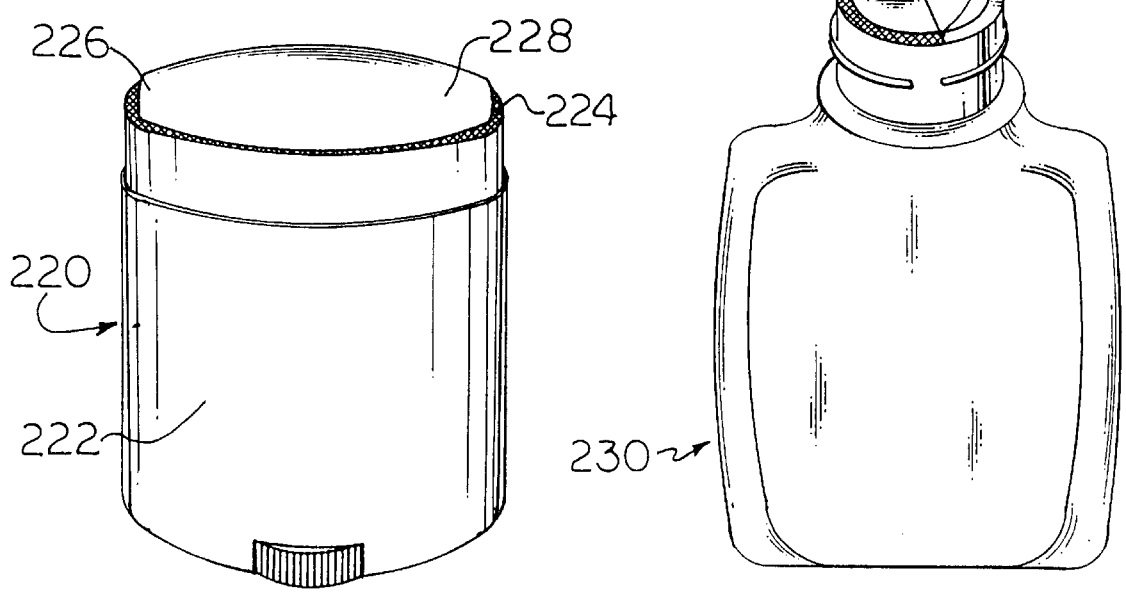

SILANE COATED FLAVOR/AROMA BARRIER FILM

This application is a continuation-in-part of application Ser. No. 08/330,634 filed on Oct. 28, 1994 now abandoned which is a Continuation application of application Ser. No. 08,124,090 filed Sep. 20, 1993, now U.S. Pat. No. 5,433,007.

FIELD OF THE INVENTION

This invention relates to composite films generally, and composite films for applications requiring low flavor/aroma transmission rates in particular.

BACKGROUND OF THE INVENTION

The packaging industry has long searched for a packaging film which can serve as a barrier to flavors and aromas. Flavor and aroma barrier films generally serve two different purposes. First, the films prevent odors from the environment from contaminating the packaged material. This is particularly important where packaged food products are brought into an odor filled environment, because without such barrier protection the food may absorb the unpleasant odors. Second, the barrier films prevent contamination of the environment from the packaged material. In other words, materials with unpleasant odors will not pollute the environment surrounding the package. Thus foods with strong or unpleasant odors may be stocked in a grocery store without regard to producing an unpleasant shopping atmosphere. Preventing flavor or aroma contamination of packaged goods is particularly important in the food and pharmaceutical industries. The present invention provides an extremely efficient, cost effective flavor/aroma barrier film which can be used in a variety of packaging end uses, such as a pouch, tube, vial, bag-in-box, stand-up pouch, gable top carton, thermoformed tray, brick-pack, box, and cigarette pack.

SUMMARY OF THE INVENTION

The present invention relates to the composition and preparation of composite films which exhibit low oxygen and flavor/aroma transmission rates, and the use of said composite films in various packaging applications. The film comprises a silane resin coated on a plastic substrate. The silane resin is formed from the mixture of a silane solution, which optionally includes an acrylate or mixtures of acrylates, and also optionally, a solvent, an additive, or water. The silane solution is coated on a plastic substrate, then the coating is dried to form a silicone resin. The coated substrate can then be used in a package as a monolayer film, or formed into a laminate by adding additional layers. The laminates of the present invention are also used in other packaging constructions.

U.S. Pat. Nos. 5,077,135 and 5,096,738 to Wyman disclose a method of imbuing polymer films with gas impermeable surface characteristics using a silane compound and cross-linking same, while providing physical adsorption adherence to the film and with sufficient coating to produce gas and related barrier characteristics. However, the present invention is distinguishable from the '135 and '738 patents because the present invention teaches a mixture of a silane and an acrylate as primary components of the silane resin, rather than the strictly silane monomers or mixtures of silane monomers disclosed in the '135 and '738 patents. Moreover, the silane of the present invention cures in air, and does not require electron beam irradiation for curing as taught in the '135 and '738 patents.

BRIEF DESCRIPTION OF THE DRAWINGS

FIG. 1 shows a monolayer film configuration of the present invention.

FIG. 2 shows a laminate construction of the present invention.

FIG. 3 shows a laminate construction of the present invention, including an adhesive.

FIG. 4 shows a top view of a closed pouch using the monolayer film or the laminate of the present invention.

FIG. 5 shows a side view of the pouch of FIG. 4 before closing.

FIG. 6 shows a top view of a closed pouch having a fin seal, constructed from the monolayer film or the laminate of the present invention.

FIG. 7 shows a side view of the pouch of FIG. 6 before closing.

FIG. 8 shows a front view of an open tube using the monolayer film or the laminate of the present invention.

FIG. 9 shows a front view of the tube of FIG. 8 after same is closed.

FIG. 10 shows a front view of a co-extruded tube made from the monolayer film or the laminate of the present invention, with a top being placed thereon.

FIG. 11 shows a front view of a closed stand-up-pouch using the monolayer or the laminate of the present invention.

FIG. 12 shows a top view of an open stand-up-pouch using the monolayer or the laminate of the present invention.

FIG. 13 shows a bottom view of a stand-up-pouch using the monolayer or the laminate of the present invention.

FIG. 14 shows a cross sectional view of a stand-up-pouch using the monolayer or the laminate of the present invention.

FIG. 15 shows a top view of a blank used to make a box, the blank containing the monolayer film or the laminate of the present invention.

FIG. 16 shows the blank of FIG. 15 folded into a box having an opening.

FIG. 17 shows the closed box of FIG. 16.

FIG. 18 shows an open bag-in-box using the monolayer film or the laminate of the present invention.

FIG. 19 shows a closed bag-in-box of FIG. 18.

FIG. 20 shows an open thermal formed package using the monolayer film or the laminate of the present invention.

FIG. 21 shows a product wrapped in the monolayer film or the laminate of the present invention.

FIG. 22 shows a vial having walls containing the laminate of the present invention.

FIG. 23 shows a container having a peelable lid made from the monolayer film or the laminate of the present invention.

DESCRIPTION OF THE PREFERRED EMBODIMENTS

While the invention is susceptible of embodiment in many different forms there is described herein in detail preferred and alternate embodiments of the invention. It should be understood, however, that the present disclosure is to be considered an exemplification of the principles of the invention and is not intended to limit the spirit and scope of the invention and/or claims of the embodiments illustrated.

As seen in FIG. 1, a preferred embodiment of the invention is a monolayer film 10 consisting of a plastic substrate 12 having disposed thereon a coating of silicone resin 14 formed from a silane solution. The plastic substrate may, but need not be, a commercially available polyolefin, such as polyethylene, polypropylene, or polyethyleneterephthalate or a polyester, such as MYLAR available from DuPont, (Wilmington, Del.), or copolymers of the above materials. The plastic substrate may also be polyamide, cellophane, polycarbonate, polyvinyl alcohol or its ethylene copolymers, coated paper or cardboard, coextruded laminates, polystyrene, and copolymers thereof. Besides a film the plastic substrate 12 may also be the wall of a bottle, as seen in FIGS. 22 and 23. The substrate may be any thickness, but will likely be at least 18 microns thick.

In the following embodiments and examples of the invention, the silicone resin is formed from a mixture of the following reactants:

(a) a silane having the formula:

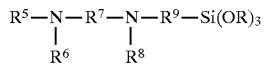

where:
R is a hydrocarbon radical having from one to four carbon atoms inclusive,
$R^5$, $R^6$, $R^8$ are selected from the group consisting of hydrogen, methyl or ethyl radicals, and at least one of $R^5$, $R^6$, $R^8$ is a hydrogen radical,
$R^7$ is a hydrocarbon radical having from two to four carbon atoms inclusive,
$R^9$ is a hydrocarbon radical having from three to six carbon atoms inclusive, (b) optionally, an acrylate selected from the group consisting of:

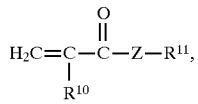

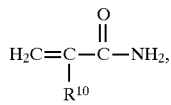

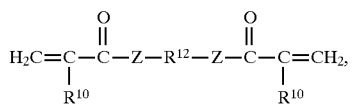

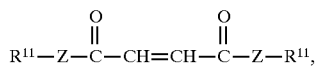

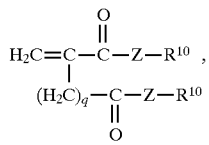

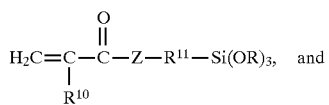

where:
R is as defined above,
$R^{10}$ is a hydrogen or methyl group,
$R^{11}$ is an alkyl or alkenyl group,
$R^{12}$ is an alkyl group, an alkenyl group, or a $-[(CH_2)_n-O]_x-(H_2C)_n$ group, where n is from 2 to 4, and x is from 1 to 6, q is 1 or 0, and
Z is an oxygen, NH, NR, or $NR^{11}$, where R is a hydrocarbon radical having from one to four carbon atoms inclusive, and $R^{11}$ is an alkyl or alkenyl group; and (c) optionally a solvent, such as methanol, ethanol, isopropanol or a mixture thereof;

and optionally, (d) an additive selected from the group consisting of: $Si(OR)_4$ or a partial hydrolyzate thereof, or $R^{11}$—Si$(OR)_3$, where $R^{11}$ is an alkyl or alkenyl group, and R is a hydrocarbon radical having from one to four carbon atoms inclusive.

In the preferred embodiment of the invention, the silane solution is prepared by initially mixing the silane component (a) with the acrylate component (b) to form a silane mixture. The acrylate component (b) may be one of the specific acrylates cited above, or a mixture of two or more of these acrylates. The weight ratio of silane component (a) to acrylate component (b) in the same silane mixture can range from 1:0 to 1:1. The silane mixture may constitute up to 100 percent of the silane solution, but it is preferred that the silane mixture constitute 10 percent of the silane solution by weight.

In an alternate embodiment of the invention, the silane solution consists only of component (a), and optionally the solvent, without component (b) to form the silane mixture. It is expected that when the silane solution consists only of component (a) or component (a) and (c), the oxygen permeability of the resulting monolayer film will be reduced by a factor of 10% over the uncoated substrate, as measured by a MOCON OX-TRAN 100A tester according to the ASTM F1307-90 at 32.5° C. and 0 percent relative humidity.

To this silane mixture is optionally added an appropriate amount of solvent, which may be methanol, ethanol, isopropanol or mixtures thereof. The amount of solvent added to the silane mixture can range from 0 percent to 99 percent of the total silane solution by weight, but is preferred to be about 80 percent by weight of the silane solution. In addition, the silane solution may be prepared without the solvent.

After adding the solvent, water may be added (up to 80 percent by weight of the silane solution, though 8 percent is preferred). Optionally, additive (d) may be added, which may comprise up to 50 percent by weight of the silane mixture. By partial hydrolyzate of $Si(OR)_4$ it is meant that portion of $Si(OR)_4$ which hydrolyizes in solution at room temperature. It appears that adding incremental amounts of the additive improves flavor/aroma barrier properties but increases the oxygen permeability rates. Once the silane solution is prepared, it is simply coated onto the plastic substrate and air or oven dried.

To prepare the preferred embodiment, a silane solution is prepared, consisting of a mixture of 10 grams of $H_2N$—$CH_2CH_2$—$NH$—$CH_2$—$CH_2$—$CH_2$—$Si(OCH_3)_3$ plus 2 grams of methyl acrylate ($H_2C$=$CH$—$(C$=$O)$—$O$—$CH_3$). To 10 grams of the resulting mixture is added 90 grams of isopropyl alcohol and 8 grams of water. This solution is coated on a plastic substrate of appropriate thickness. After coating, the silane solution is allowed to cure to form a silicone resin at room temperature.

The monolayer films of the present invention can be used as part of a laminate, which may be useful in a variety of packaging constructions. A typical laminate construction is shown in FIG. 2. The laminate 20 has plastic substrate 22 and second substrate 24 and silicone resin layer 26. Substrates 22 or 24, or possibly both, can be made of a heat sealable material, such as polyethylene, polypropylene, a polyethylene copolymer, ethylene vinyl alcohol, a polyester or coextrusions or laminates thereof. In addition, either substrate 22 or 24 could be an acrylic coating. Substrates 22 or 24 can also be made from materials that can provide structural support to the package, such as polypropylene, polyester, polyethylene or copolymers thereof, polyamide, cellophane, polycarbonate, polyvinyl alcohol or its ethylene copolymers, paper coated or uncoated paper or cardboard, coextruded laminates, polystyrene, and copolymers thereof. The configurations can include any combination of sealable or structural layers, and those skilled in the art will readily appreciate that multiple layers of sealable and/or structural materials may be used in a wide variety of combinations. In addition to structural and sealing properties, substrates 22 and 24 also may be selected to enhance the barrier properties of the silicone resin 26 or to give different performance properties not characteristic of the silicone resin 26, such as heat shrinkablity. Such films as described herein can be used to overwrap a variety of products such as meat, candy, fresh fruit, etc.

The laminate 20 may also be formed by extrusion lamination of individual layers, or one or more of the layers of the laminate may be bound together using an adhesive, as shown in FIG. 3, where substrates 32 and 34 represent sealable or structural layers, 36 is the silicone resin, and 38 is the adhesive. Such adhesives are well known in the art, particularly useful adhesives being polyurethanes, polyvinyl acetate, or acrylic emulsions. Substrates 32 and 34 can be any of the materials cited above, i.e., either sealable or structural materials.

The silicone resin containing films and laminates of the present invention are especially useful in packaging applications. The barrier films can used in any application where an oxygen, $CO_2$, aroma or flavor barrier is desired, and it is anticipated that the film will be useful for packaging and preserving a wide variety of food and beverage products, as well as non-food products, such as detergents, soaps or pharmaceutical products. The present invention will also be useful in a variety of medical applications, such as coating plastic bottles, intravenous IV bags, and the like. The following is just a partial list of the end uses of the present invention.

Films or sheets of the present invention, either monolayer 10 or laminates 20 or 30, can be formed into a finished package or "film-package", such as a pouch, by conventional methods, e.g., by forming heat or adhesive seals about the periphery of the shape to be formed into a pouch, as seen in FIGS. 4–7. FIGS. 4 and 5 show pouch 40 in the open (FIG. 4) and sealed (FIG. 5) configurations. Open pouch 40 in FIG. 4 is made from monolayer film or laminate 42 and has opening 52, fold 50, seals 44 and 46. Pouch 40 is shown in the sealed configuration in FIG. 5, and is made from monolayer film or laminate 42 and fold 50, seals 44, 46 and 48. If a square pouch such as a retort pouch is desired, a rectangular piece of monolayer film or laminate 42 twice the desired length of the pouch 40 is folded at fold 50. The two sides are heat or adhesive sealed (for example, 44 and 46), product to be packaged inserted though opening 52. The remaining open side 48 is then heat or adhesive sealed. Another method for making a typical retort pouch is by sealing on three sides face-to-face films, filling the thus formed open pouch with product, and then sealing the fourth side (not shown).

FIGS. 6 and 7 show pouch 60 in the open (FIG. 6) and sealed (FIG. 7) configurations. Open pouch 60 in FIG. 6 is made from monolayer film or laminate 62 and has opening 64, lap or fin seal 66, and seal 68. Pouch 60 is shown in the sealed configuration in FIG. 7, and is made from monolayer film or laminate 62 and has folds 72 and 74, and seals 68 and 70. After a product is inserted through opening 64 in the open pouch 60, the pouch is closed with seal 70. The seals can be heat or adhesive type seals. Folds 72 and 74 can be regular folds as shown, or gusseted folds (not shown). For background in pouches and their production, reference is made to U.S. Pat. Nos. 4,190,477, 4,311,742, 4,360,550, and 4,424,256, each of which being hereby incorporated herein by reference.

In addition to a pouch, the monolayer films and the laminates above described can be used to form tube type packages as shown in FIGS. 8, 9 and 10. The open tube 80 in FIG. 8 is made from monolayer film or laminate 82 and has length seal (lap or fin) 84, opening 86 and closure 88. The closure 88 can be any type of fastening device, but will often be a plastic or metal clip. FIG. 10 illustrates extruded tube 100, made from monolayer or laminate composition 102, having heat or adhesive seal 104, top 106 and opening 108. Tube type containers can be formed by wrapping the monolayer film or laminate around a hollow mandrel, where the overlapped edges are heat or adhesive sealed to form a tube and the product is introduced through the opening 86. Closures or clips, or heat or adhesive seals are applied to the open the end 86 of the package, and the finished package is discharged. FIG. 9 shows tube 80 after closing. Tubes of the present invention can also be formed by co-extruding the laminate or monolayer films, then closed at the ends as earlier indicated.

FIGS. 11–14 show a "stand-up-pouch". FIG. 11 shows a front view of stand-up-pouch 110 having wall 122, top seal 114, side seals 112 and 116, and bottom film 118. The stand-up-pouch 110 is a semi-rigid container formed from a flexible-semi rigid film used to package liquids, and made from the monolayer film or laminate 126 of the present invention.

FIG. 12 shows a top view of stand-up-pouch 110 before closure, having opening 120, walls 122 and 124, side seals 112 and 116, and bottom film 118.

FIG. 13 shows a bottom view of stand-up-pouch 110 having walls 122 and 124, side seals 112 and 116, and bottom film 118.

FIG. 14 shows a cross sectional view of stand-up-pouch 110 having walls 122 and 124, side seals 112 and 116, and bottom film 118.

FIGS. 15–17 show a conventional box type carton construction. FIG. 15 shows a part of a blank 150 for a package of the indicated kind, made from the monolayer film or laminate 172 of the present invention. The blank 150 is provided with fold or score lines along which the blank 150 is to be folded as to form the finished package. Of course, it will be readily apparent to one of ordinary skill in the art that there exist a number of different box type configurations for packages and corresponding blanks, such as bric packs, gable top cartons, cigarette boxes and the term "box" as used herein is intended to encompass all of these types of containers.

The box 162 shown in FIG. 16–17 has four side walls 152–58. Box 162 also has two end wall portions 164 and 166 extending the length of the blank 150, which constitute the top 168 and 170 when the blank 150 is folded into container 162.

The box type carton is constructed from sheets of material which typically includes at least a basic outer layer of cardboard and an inner layer of the monolayer film or laminate of the present invention 172. Normally, the sheet is entirely plastic coated and can include additional barrier layers. Suitable plastics for the carton also include vinyl resins such as polyvinyl chloride, regenerated cellulose, polypropylene, polyethylene terephalate, polycarbonates and other plastics that are used for food products. The sealing of the box 160 with the marginal and end wall portions in the position described is typically done with heat which fuses the sealable layers of the laminate with the sealing zone on marginal portion 160 and a corresponding portion of wall 152. Similar seals are made for top 168 and bottom 170.

FIGS. 18 and 19 show a flexible bag for liquids or viscous fluids incorporating a tap 182. The bag is made from a flexible monolayer film or laminate of the present invention 184. The bag 180 may be constructed from a blank similar to that shown in FIG. 15, except the laminate or monolayer film will be flexible instead of rigid. The seals 186 and 188 can be heat or cold sealed. The bag may be filled through open top shown in FIG. 18 or through tap 182.

FIG. 20 shows a thermoformed container 200, having receptacle 202 and top 204. Thermoformed containers 200 are typically formed under heat and pressure by drawing a sheet of the monolayer film or laminate 206 of the present invention in a mold. After the contents are filled with the product, the thermoformed container is covered with lid stock 204, using heat, radio frequency, ultrasound, cold seal or peelable seals. The lid stock 204, is may be made from the same or different monolayer film or laminate. The most typically used laminate will have substrates of a thermoformable resin such as polystyrene, polyproplylene and copolymers thereof, polyamide and polycarbonate laminates and coextrusions thereof.

FIG. 21 shows the laminate or monolayer film 210 of the present invention used as an overwrap for a piece of candy.

FIG. 22 shows a container 220 having a monolayer coating 222 of a silicone resin on a plastic substrate 224. Container 220 has opening 226, which can be covered with lid or top 228. Plastic substrate 224 can be polyethylene, polypropylene, a polyethylene copolymer, ethylene vinyl alcohol, a polyester or coextrusions thereof, an acrylic coating, its polyamide, polycarbonate, polyurethane, polyvinyl alcohol or ether copolymers.

FIG. 23 shows bottle 230 having peelable lid stock made from the monolayer film or laminate 232 of the present invention. Bottle 230 can be of any material, such as plastic, glass or metal. If the bottle 230 is plastic, same may be coated with a silicone resin coating made from the silane solution of this invention.

The packages described above can be used to package a wide variety of food and beverage products such as wine, milk and other dairy products, such as ice cream yogurt, butter, cheese; soft drinks, juices, coffee, and other non-alcoholic beverages, tomato products, condiments, potato chips and other dry snacks, cakes, biscuits, breads, chocolate, meats, cereals, frozen foods and meals. The packages can also be used to package non-food products, such as detergents, soaps, pharmaceutical, air fresheners, cigarettes and other tobacco products, etc.

EXAMPLES

The following flavor barrier transmission rates were measured using the Fisher Permeability Cup, available from Fisher Scientific, Pittsburgh, Pa. The Fisher Cup was filled with one of d-limonene, toluene, methyl salicylate, pinene, ally sulfide or ethyl acetate. The cup was then covered with the test film and clamped to the cup. The filled cup was weighed and left to stand at ambient temperature for 24 to 48 hours, then weighed again.

The measurements of oxygen permeability for each of the composite films discussed in the following examples were made using pure oxygen on a MOCON OX-TRAN 100A tester according to the ASTM F1307-90 at 32.5° C. "Dry" readings were taken in an environment where the relative humidity was 0 percent and the "wet" readings were taken in an environment where the relative humidity was greater than 85 percent. Corona treatment of the substrates was done by passing the substrate under a Tesla Coil for approximately one-half second. All the films produced below are transparent, flexible and creasable, and will not crack when bent.

Example I

To prepare a each of the following composite films, low density polyethylene (LDPE) substrates of 100 micron thickness were corona treated. Each LDPE substrate was coated on both sides with one of the silane solutions described below. Coating thickness of the silane layer of each film was estimated to be between 1 and 2 microns. After coating, each film was allowed to cure at room temperature to form a silicone resin.

Silane Solution No. 1 consisted of a mixture of 10 grams of $H_2N—CH_2CH_2—NH—CH_2—CH_2—CH_2—Si(OCH_3)_3$ plus 90 grams of isopropyl alcohol and 8 grams of water.

Silane Solution No. 2 consisted of a mixture of 10 grams of $H_2N—CH_2CH_2—NH—CH_2—CH_2—CH_2—Si(OCH_3)_3$ plus 2 grams of methyl acrylate ($H_2C=CH—(C=O)—O—CH_3$). To 10 grams of the resulting mixture was added 90 grams of isopropyl alcohol and 8 grams of water.

Silane Solution No. 3 consisted of a mixture of 10 grams of $H_2N—CH_2CH_2—NH—CH_2—CH_2—CH_2—Si(OCH_3)_3$ plus 3.8 grams of dimethyl maleate ($H_3C—O—(C=O)—CH=CH—C(C=O)—O—CH_3$). To 10 grams of the resulting mixture was added 90 grams of isopropyl alcohol and 8 grams of water.

Silane Solution No. 4 consisted of a mixture of 10 grams of $H_2N—CH_2CH_2—NH—CH_2—CH_2—CH_2—Si(OCH_3)_3$ plus 2 grams of triethylene glycol dimethylacrylate ($H_2C=C(CH_3)—C(=O)—O—(CH_2CH_2O)_3—C(C=O)—C(CH_3)=CH_2$). To 10 grams of the resulting mixture was added 90 grams of isopropyl alcohol and 8 grams of water.

Silane Solution No. 5 consisted of a mixture of 10 grams of $H_2N—CH_2CH_2—NH—CH_2—CH_2—CH_2—Si(OCH_3)_3$ plus 2 grams of 3-methacryloxypropyltrimethoxysilane ($H_2C=C(CH_3)—C(=O)—O—CH_2CH2CH_2—Si(OCH_3)_3$). To 10 grams of the resulting mixture was added 90 grams of isopropyl alcohol and 8 grams of water.

Silane Solution No. 6 consisted of a mixture of 10 grams of $H_2N—CH_2CH_2—NH—CH_2—CH_2—CH_2—Si(OCH_3)_3$ plus 4 grams of dimethyl itaconate ($H_3C—O—C(=O)—CH_2—C(=CH_2)—C(=O)—O—(CH_3)$). To 10 grams of the resulting mixture was added 90 grams of isopropyl alcohol and 8 grams of water.

Silane Solution No. 7 consisted of a mixture of 10 grams of $H_2N—CH_2CH_2—NH—CH_2—CH_2—CH_2—Si(OCH_3)_3$, 90 grams of isopropyl alcohol, 8 grams of water and 2 grams of polydiethoxysiloxane.

Silane Solution No. 8 consisted of a mixture of 10 grams of $H_2N—CH_2CH_2—NH—CH_2—CH_2—CH_2—Si(OCH_3)_3$ plus 2 grams of methyl acrylate ($H_2C=CH—(C=O)—O—CH_3$). To 10 grams of the resulting mixture was added 90 grams of isopropyl alcohol, 8 grams of water, and 2 grams of the additive polydiethoxysiloxane.

Silane Solution No. 9 consisted of a mixture of 10 grams of $H_2N—CH_2CH_2—NH—CH_2—CH_2—CH_2—Si(OCH_3)_3$ plus 3 grams of methyl acrylate ($H_2C=CH-(C=O)-O-CH_3$). To 10 grams of the resulting mixture was added 90 grams of isopropyl alcohol, 8 grams of water, and 2 grams of the additive polydiethoxysiloxane.

Silane Solution No. 10 consisted of a mixture of 10 grams of $H_2N-CH_2CH_2-NH-CH_2-CH_2-CH_2-Si(OCH_3)_3$ plus 2 grams of methyl acrylate ($H_2C=CH-(C=O)-O-CH_3$). To 10 grams of the resulting mixture was added 90 grams of isopropyl alcohol, 8 grams of water, and 2 grams of the additive $CH_3-Si(OCH_3)_3$.

Silane Solution No. 11 consisted of a mixture of 10 grams of $H_2N-CH_2CH_2-NH-CH_2-CH_2-CH_2-Si(OCH_3)_3$ plus 2 grams of triethylene glycol dimethylacrylate ($H_2C=C(CH_3)-C(=O)-O-(CH_2CH_2O)_3-C(C=O)-C(CH_3)=CH_2$). To 10 grams of the resulting mixture was added 90 grams of isopropyl alcohol, 8 grams of water, and 1 gram of the additive polydiethoxysiloxane.

Silane Solution No. 12 consisted of a mixture of 10 grams of $H_2N-CH_2CH_2-NH-CH_2-CH_2-CH_2-Si(OCH_3)_3$ plus 2 grams of acrylamide ($H_2C=CH-C(=O)-NH_2$). To 10 grams of the resulting mixture was added 90 grams of isopropyl alcohol, 8 grams of water.

Silane Solution No. 13 consisted of 25 grams $HCl.CH_2=CHC_6H_4CH_2NHCH_2CH_2NHCH_2CH_2CH_2-Si(OMe)_3$ solution (40% by weight in methanol), 75 grams methanol and 4 grams water, and was aged for 16 hours prior to coating. The excess solvent was removed by drying the treated film for 2 hours at 25° C. The cure of the silane solution took place by electron beam irradiation, which consisted of exposure of the film to 4 megarads of radiation.

The results of the of the oxygen permeability tests and the flavor barrier tests of films made from the above silane solutions are reported below in Table 1. Flavor barrier tests measured the transmission rate of d-Limonene and toluene using the previously described method.

TABLE 1

Oxygen, d-limonene, and toluene transmission rates of silane coated 100 micron LDPE films.

| Formulation | O2 Dry (c.c/m2/day) | O2 Wet (c.c/m2/day) | Limon (g/m2/day) | Tolue (g/m2/day) |
|---|---|---|---|---|
| Uncoated LDPE | 2400 | 2400 | 113 | 785 |
| Silane Solution No. 1 | 80 | 1100 | 6.1 | 8.8 |
| Silane Solution No. 2 | 50 | 290 | 0.8 | 5.9 |
| Silane Solution No. 3 | — | — | 1.8 | 9.8 |
| Silane Solution No. 4 | 800 | — | <0.1 | 21.8 |
| Silane Solution No. 5 | — | — | <0.1 | 5.2 |
| Silane Solution No. 6 | 15 | 440 | 0.6 | 4.4 |
| Silane Solution No. 7 | 90 | — | <0.1 | 7.8 |
| Silane Solution No. 8 | 210 | 410 | <0.1 | 4.8 |
| Silane Solution No. 9 | — | — | <0.1 | 7.3 |
| Silane Solution No. 10 | 760 | — | <0.1 | 7.2 |
| Silane Solution No. 11 | 650 | — | — | — |
| Silane Solution No. 12 | .75 | 900 | 0.5 | 5.0 |
| Silane Solution No. 13 | 30–100 | >2000 | 66 | 794 |

Table 1 shows that coating the LDPE with a silane solution drastically improves both the oxygen and flavor/aroma barrier properties over the uncoated LDPE. Moreover, the combinations of silane plus acrylate (Silane Solutions No. 1–12) showed significant improvement in oxygen and flavor/aroma barrier characteristics over the silane solution (No. 13) which did not include an acrylate component and was cured with electron beam irradiation.

Example II

Samples of the films made from Silane Solutions No. 2, No. 8, and No. 13, as described above, and uncoated low density polyethylene film (LDPE) film were tested on flavor/aroma components other than d-limonene and toluene, namely, methyl salicylate, pinene, allyl sulfide, and ethyl acetate. The results are summarized in Table 2.

TABLE 2

Permeability of Other Flavors/Aromas

| Flavor/Aroma Component | Transmission Rate (gm/sq. m/day) | | | |
|---|---|---|---|---|
| | No. 2 | No. 8 | No. 13 | Uncoated LDPE |
| Methyl Salicylate | <0.1 | <0.1 | <0.1 | 10.7 |
| Pinene | 0.5 | 0.1 | 0.4 | 75.1 |
| Allyl Sulfide | 0.7 | 0.5 | 2.9 | 157 |
| Ethyl Acetate | 17.0 | 14.0 | 14.8 | 120 |

As is apparent from the data in Table 2, the silane coated films show a dramatic decrease in flavor/aroma transmission rates over a wide variety of flavor/aroma components when compared to uncoated LDPE. Silane Solutions No. 2 and 8 showed excellent flavor/aroma transmission rates even though the silane solution cured in air, rather than by electron beam irradiation.

Example III

To prepare each of the following coated films, low density polyethylene (LDPE) substrates of 100 micron thickness were corona treated. Each LDPE was coated on one side with the use of a #4 mayer rod using one of the formulations described below. Coating thickness of the silane layer of each film was estimated to be between 2.5 and 3.5 microns. After coating, each film was cured at 50° C. for 6 mins.

Silane formulation 14 consisted of a mixture of 90 grams of $H_2NCH_2CH_2NHCH_2CH_2CH_2Si(OCH_3)_3$ plus 10.15 grams of ethyl acrylate ($H_2C=CH-(C=O)-OCH_2CH_3$).

Silane formulation 15 consisted of a mixture of 90 grams of $H_2NCH_2CH_2NHCH_2CH_2CH_2Si(OCH_3)_3$ plus 10 grams of hydroxyethyl acrylate ($H_2C=CH-(C=O)-OCH_2CH_2OH$). No solvent was added to either Silane formulation 1 or 2.

The results of the dry oxygen permeability tests and the flavor barrier tests of films made from the above silane formulations are reported below in Table 3. The dry oxygen permeability as well as the flavor (d-limonene and toluene) barrier were measured as described previously.

TABLE 3

Oxygen, d-limonene and toluene transmission rates of silane coated 100 micron LDPE films.

| Formulation | O2 dry (cc/m$^2$/day) | limonene (g/m$^2$/day) | toluene (g/m$^2$/day) |
|---|---|---|---|
| uncoated | — | 131 | 1044 |
| Silane formulation 14 | 39 | 30 | 513 |
| Silane formulation 15 | 165 | 9 | 475 |

The foregoing formulations show results consistent with the formulations containing solvent.

The foregoing specification describes only the preferred embodiment and the alternate embodiments of the invention. Other embodiments may be articulated as well. It is expected that others will perceive differences which while differing from the foregoing, do not depart from the spirit and scope of the invention herein described and claimed.

What is claimed:

1. A coated article comprising:
a layer of a silane mixture free of solvent and curable in air without irradiation disposed on a plastic substrate wherein said silane mixture consists essentially of
(a) a silane having the formula:

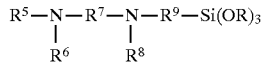

where
R is a hydrocarbon radical having from one to four carbon atoms inclusive,
$R^5$, $R^6$, $R^8$ are selected from the group consisting of hydrogen, methyl and ethyl radicals, and at least one of $R^5$, $R^6$, or $R^8$ is a hydrogen radical,
$R^7$ is a hydrocarbon radical having from two to four carbon atoms inclusive,
$R^9$ is a hydrocarbon radical having from three to six carbon atoms inclusive,
(b) an acrylate selected from the group consisting of:

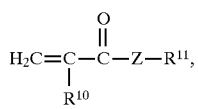

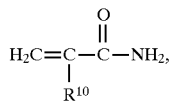

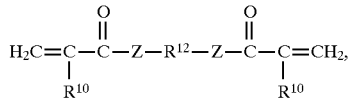

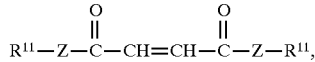

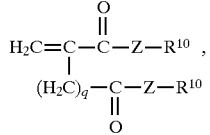

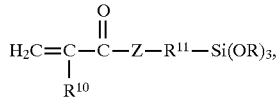

where:
R is as defined above,
$R^{10}$ is a hydrogen or methyl group,
$R^{11}$ is an alkyl or alkenyl group,
$R^{12}$ is an alkyl group, an alkenyl group, or a $-[(CH_2)_n-O]_x-(H_2C)_n$ group, where n is from 2 to 4, and x is from 1 to 6,
q is 1 or 0, and
Z is an oxygen, NH, NR, or $NR^{11}$, where R is a hydrocarbon radical having from one to four carbon atoms inclusive, and $R^{11}$ is an alkyl or alkenyl group.

2. The coated article of claim 1, wherein the plastic substrate is selected from the group consisting of polyethylene, polypropylene, a polyethylene copolymer, a polyester, polyester coextrusions, laminates of polyesters and polyester coextrusions, polyamide, cellophane, polycarbonate, polyvinyl alcohol, ethylene/vinyl alcohol copolymers, coated paper, coated cardboard, coextruded laminates, and polystyrene.

3. The coated article of claim 1, wherein the substrate has an acrylic coating disposed thereon.

4. A multi-layer construction consisting essentially of:
a single layer of silicone resin disposed between a plastic substrate and a second substrate wherein said silicone resin is derived from a silane mixture consisting essentially of:
(a) a silane having the formula:

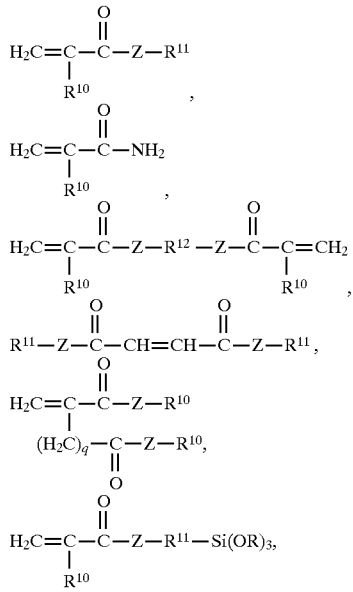

where:
R is as defined above,
$R^{10}$ is a hydrogen or methyl group,
$R^{11}$ is an alkyl or alkenyl group,
$R^{12}$ is an alkyl group, an alkenyl group, or a $-[(CH_2)_n-O]_x-(H_2C)_n$ group, where each n is independently from 2 to 4, and x is from 1 to 6,
q is 1 or 0, and
Z is oxygen, NH, NR, or $NR^1$, where R is a hydrocarbon radical having from one to four carbon atoms inclusive, and $R^{11}$ is an alkyl or alkenyl group; and
(c) and optionally, a solvent,
wherein the plastic substrate and the second substrate are independently selected from the group consisting of polyethylene polypropylene, a polyethylene copolymer, a polyester, polyester coextrusions, laminates of polyesters and polyester coextrusions, polyamide, cellophane, polycarbonate, ethylene/vinyl alcohol copolymers, coated paper, coated cardboard, coextruded laminates, and polystyrene.

5. The multi-layer construction of claim 4 wherein said solvent is an alcohol.

6. The multi-layer construction of claim 4 wherein said silane mixture includes water.

7. The multi-layer construction of claim 4 wherein the plastic substrate or the second substrate has an acrylic coating disposed thereon.

* * * * *